(12) United States Patent
Anupam et al.

(10) Patent No.: US 7,756,534 B2
(45) Date of Patent: Jul. 13, 2010

(54) PROVISION OF LOCATION-BASED SERVICES UTILIZING USER MOVEMENT STATISTICS

(75) Inventors: Vinod Anupam, Scotch Plains, NJ (US); Suryanarayan Perinkulam, Clinton, NJ (US); Chitra A. Phadke, Basking Ridge, NJ (US); Viswanath Poosala, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 944 days.

(21) Appl. No.: 11/437,166

(22) Filed: May 19, 2006

(65) Prior Publication Data

US 2007/0270163 A1 Nov. 22, 2007

(51) Int. Cl.
*H04B 7/00* (2006.01)
(52) U.S. Cl. ............. 455/466; 455/456.3; 455/456.4; 455/458; 705/10; 705/14; 705/201; 705/400
(58) Field of Classification Search .......... 705/14, 705/10, 7, 201, 400; 455/466, 456.3, 456.4, 455/456.1, 456.2, 458, 404.2
See application file for complete search history.

(56) References Cited

U.S. PATENT DOCUMENTS

| 6,571,279 | B1 * | 5/2003 | Herz et al. ............. 709/217 |
| 6,879,838 | B2 * | 4/2005 | Rankin et al. .......... 455/456.6 |
| 6,985,747 | B2 | 1/2006 | Chithambaram |
| 2002/0077130 | A1 | 6/2002 | Owensby |
| 2002/0095333 | A1 | 7/2002 | Jokinen et al. |
| 2002/0164977 | A1 | 11/2002 | Link, II et al. |
| 2003/0198346 | A1 | 10/2003 | Meifu et al. |
| 2004/0002897 | A1 * | 1/2004 | Vishik ................ 705/14 |
| 2004/0209602 | A1 | 10/2004 | Joyce et al. |
| 2005/0221843 | A1 | 10/2005 | Friedman et al. |
| 2005/0227711 | A1 | 10/2005 | Orwant et al. |
| 2006/0022048 | A1 | 2/2006 | Johnson |
| 2006/0058037 | A1 | 3/2006 | Kenyon |
| 2006/0088028 | A1 | 4/2006 | Leiber et al. |
| 2006/0099963 | A1 | 5/2006 | Stephens |

FOREIGN PATENT DOCUMENTS

WO 2007011349 11/2007

* cited by examiner

*Primary Examiner*—Patrick N Edouard
*Assistant Examiner*—Julio Perez
(74) *Attorney, Agent, or Firm*—Ryan, Mason & Lewis, LLP

(57) ABSTRACT

Location-based services are provided in a communication system comprising at least a portion of at least one wireless network. One aspect of the invention relates to generation of user movement statistics that may be utilized to facilitate the development of targeted marketing campaigns or other types of message delivery. In this aspect, the user movement statistics are generated based on location and profile information for mobile user devices, and delivery of at least one message to a given one of the mobile user devices is controlled based on the user movement statistics. The user movement statistics may comprise, for example, information sufficient to determine approximately how many users having particular designated characteristics are likely to be in a given location at a given time, and may be utilized to determine prices charged for delivery of messages to the mobile user devices.

18 Claims, 5 Drawing Sheets

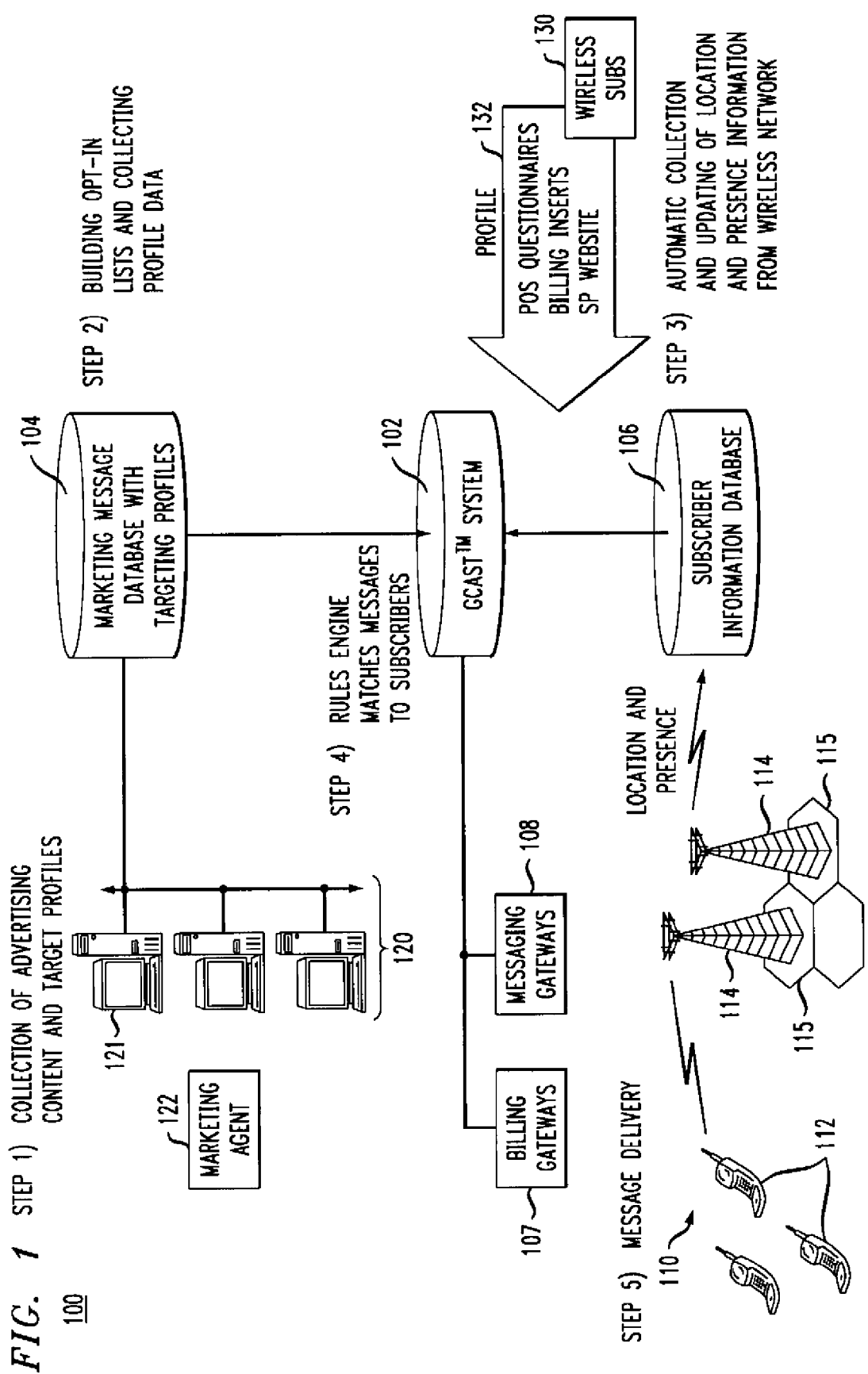

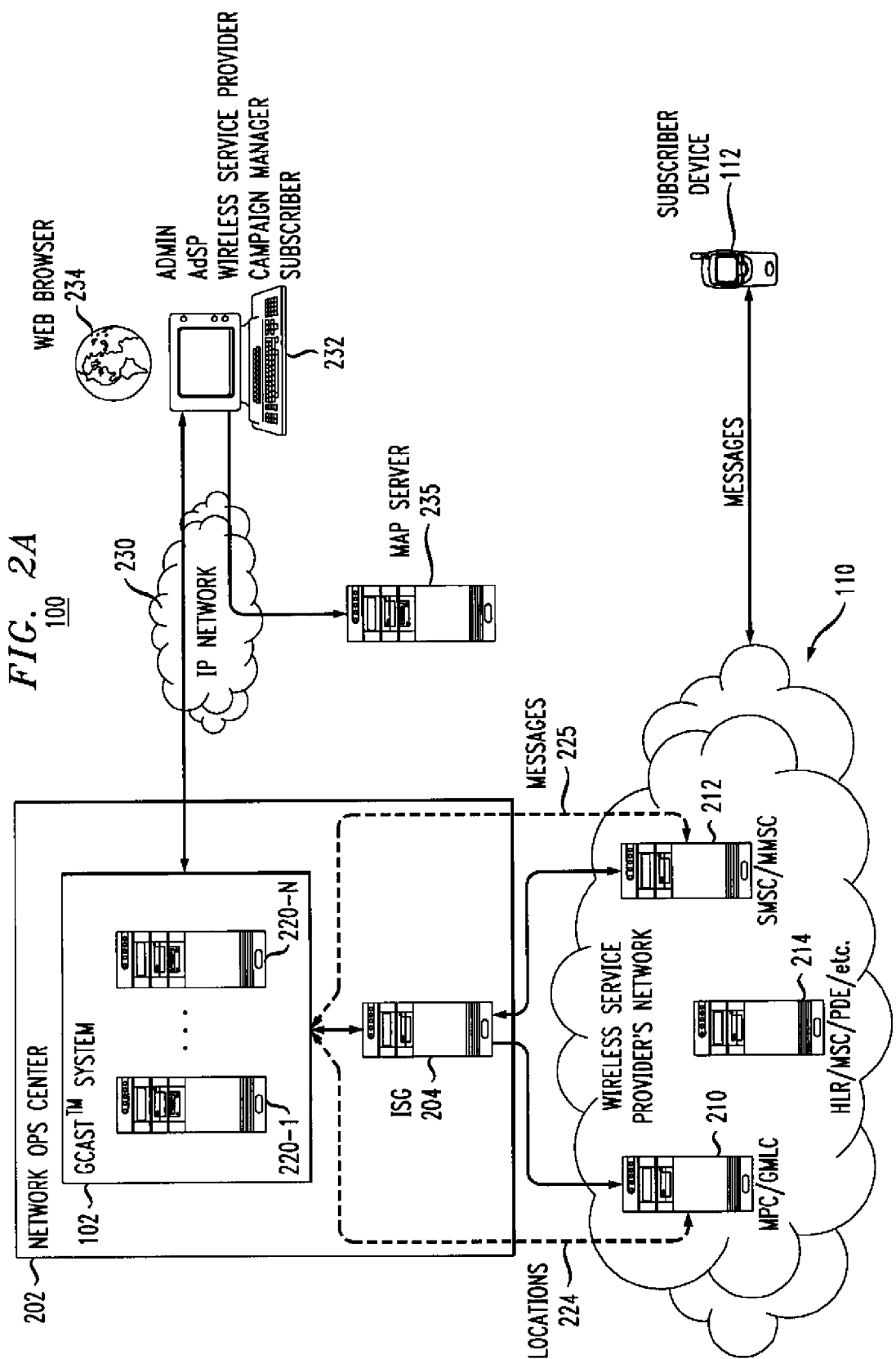

PROVISION OF LOCATION-BASED SERVICES UTILIZING USER MOVEMENT STATISTICS

RELATED APPLICATIONS

The present application is related to the following U.S. patent applications:

Ser. No. 11/437,154, entitled "Methods and Apparatus for Providing Location-Based Services in a Wireless Communication System."

Ser. No. 11/437,065, entitled "Auctioning of Message Delivery Opportunities in a Location-Based Services System."

Ser. No. 11/437,157, entitled "Prioritization of Location Queries in a Location-Based Services System."

Ser. No. 11/437,105, entitled "Traffic-Synchronized Location Measurement."

Ser. No. 11/437,104, entitled "Mobile-Initiated Location Measurement."

Ser. No. 11/437,152, entitled "Broadcast Channel Delivery of Location-Based Services Information."

Ser. No. 11/437,153, entitled "Reverse Lookup of Mobile Location."

All of the above-listed applications are filed concurrently herewith, and are incorporated by reference herein.

FIELD OF THE INVENTION

The present invention relates generally to wireless networks and other types of wireless communication systems, and more particularly to techniques for providing location-based message delivery and other services to mobile user devices in such systems.

BACKGROUND OF THE INVENTION

A wide variety of different types of wireless communication systems are known. For example, a typical wireless cellular network includes a multitude of interconnected base stations which communicate with mobile user devices within defined coverage areas.

Recently, techniques have been developed which deliver advertising or other types of messages to mobile user devices based on the current locations of those devices. Thus, if a given user device is determined to be in close proximity to a particular retail establishment, an advertisement associated with that establishment may be delivered to the user device.

Examples of techniques of this type are described in U.S. Patent Application Publication Nos. 2002/0095333, entitled "Real-Time Wireless E-Coupon (Promotion) Definition Based On Available Segment," 2002/0164977, entitled "System and Method for Providing Short Message Targeted Advertisements Over a Wireless Communications Network," 2003/0198346, entitled "Push Delivery Service Providing Method, Information Providing Service System, Server System and User Station," 2004/0209602, entitled "Location-Based Content Delivery," 2005/0221843, entitled "Distribution of Location Specific Advertising Information Via Wireless Communication Network," 2005/0227711, entitled "Method and Apparatus for Creating, Directing, Storing and Automatically Delivering a Message to an Intended Recipient Upon Arrival of a Specified Mobile Object at a Designated Location," and 2006/0058037, entitled "Custom Information For Wireless Subscribers Based on Proximity."

Unfortunately, conventional wireless communication systems such as those described in the above-cited references suffer from a number of significant drawbacks. For example, the conventional systems are typically configured in a manner which can lead to excessive location queries or other types of location-related communications between the base stations and the mobile user devices, thereby undermining the ability of the systems to support their primary voice and data traffic functionality. Also, the above-noted systems are lacking in terms of the revenue-generating capabilities that are provided. In view of these and other problems associated with conventional practice, a need exists for improved techniques for delivering location-based services to mobile user devices.

SUMMARY OF THE INVENTION

The present invention in one or more illustrative embodiments provides improved techniques for delivering location-based services to mobile user devices associated with a wireless network.

One aspect of the invention relates to generation of user movement statistics that may be utilized to facilitate the development of targeted marketing campaigns or other types of message delivery. In this aspect, the user movement statistics are generated based on location and profile information for the mobile user devices, and delivery of at least one message to a given one of the mobile user devices is controlled based on the user movement statistics.

The user movement statistics may comprise, for example, information sufficient to determine approximately how many users having particular designated characteristics are likely to be in a given location at a given time, and may be utilized to determine prices charged for delivery of messages to the mobile user devices. The user movement statistics may also or alternatively be utilized to determine appropriate bidding levels for auction of one or more message delivery opportunities to interested parties, to estimate impact of a marketing campaign comprising messages to be delivered to the mobile user devices, or for other purposes relating to the controlled delivery of messages.

In an illustrative embodiment, the operations associated with generation and utilization of user movement statistics are implemented at least in part in a location-based services system, referred to herein as a Gcast™ system, which may be coupled to a message service center or other element of the wireless network via a gateway. The location-based services system may be coupled to a marketing message database and a subscriber information database. The location-based services system may comprise, by way of example, at least one processing device accessible to a browser-equipped external processing device over an Internet protocol network. The location-based services system may comprise a location server that is configured to minimize location-related communications between the mobile user devices and base stations of the wireless network by, for example, eliminating duplicate location queries and prioritizing location queries.

The present invention in the illustrative embodiments provides significant advantages over the conventional systems identified above. For example, the number of location queries and other types of location-related communications that are required can be considerably reduced, while still allowing implementation of a wide variety of location-based services within the communication system. This prevents location-related communications from overwhelming the wireless network and interfering with the primary voice and data traffic functionality of that network. Furthermore, many additional revenue-generating capabilities are provided, including the above-noted auction of message delivery opportunities, as well as more effective marketing through utilization of user movement statistics.

These and other features and advantages of the present invention will become more apparent from the accompanying drawings and the following detailed description.

BRIEF DESCRIPTION OF THE DRAWINGS

FIG. 1 is a combination block and flow diagram illustrating the general configuration and operation of a wireless communication system comprising a location-based services system in an illustrative embodiment of the invention.

FIGS. 2A and 2B show possible implementations of at least a portion of the FIG. 1 wireless communication system.

DETAILED DESCRIPTION OF THE INVENTION

Figure 2B:
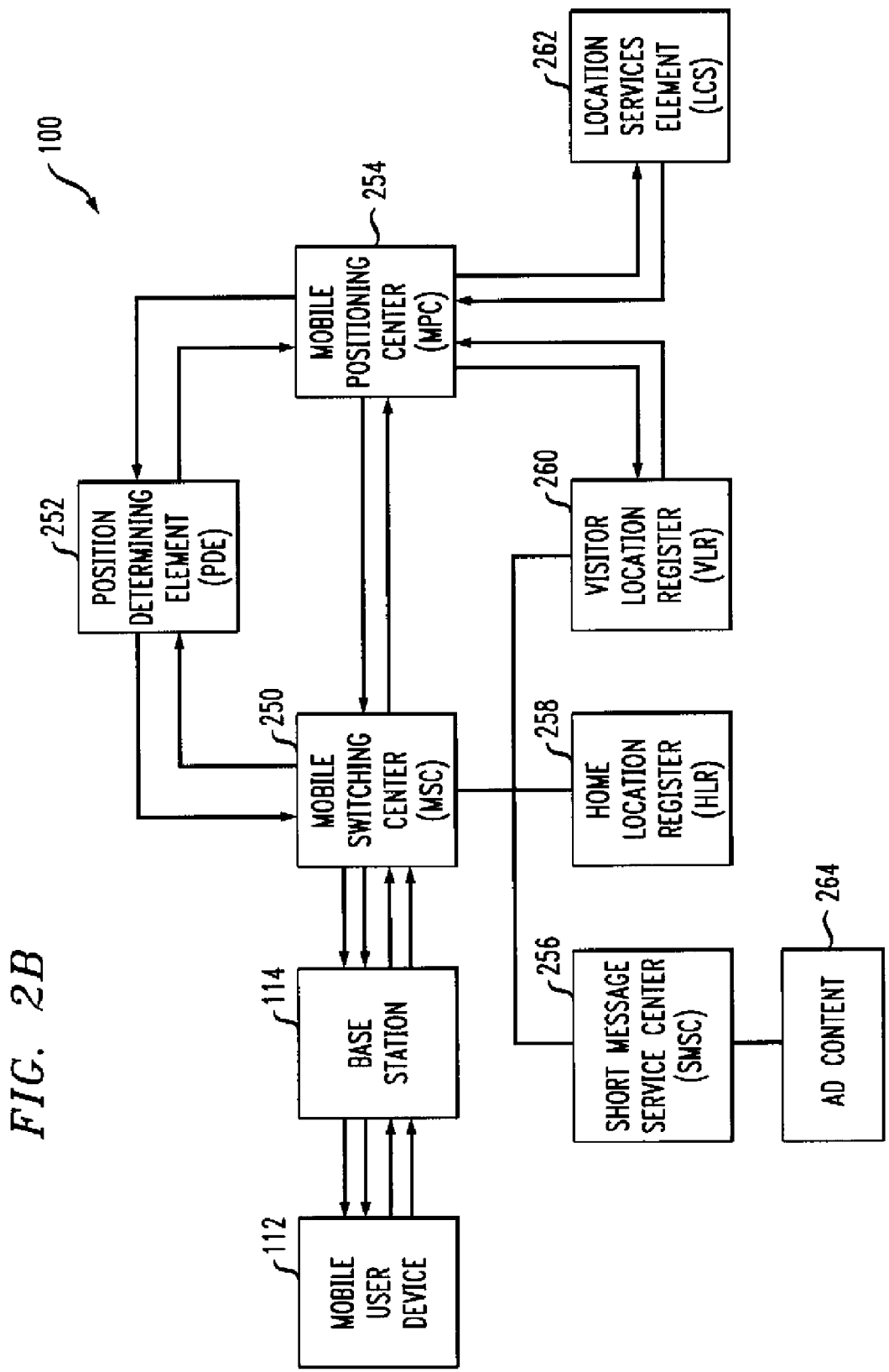

The present invention will be illustrated below in conjunction with exemplary wireless communication systems and associated location-based services. It should be understood, however, that the invention is not limited to use with any particular type of wireless system or location-based service(s). The disclosed techniques are suitable for use with a wide variety of other systems and in providing numerous alternative services. For example, the described techniques are applicable to many different types of wireless networks, including those utilizing well-known standards such as UMTS, W-CDMA, CDMA2000, HSDPA, IEEE 802.11, etc. The term "wireless communication system" as used herein is intended to include these and other types of wireless networks, as well as sub-networks or other portions of such networks and combinations of multiple networks operating in accordance with potentially different standards. A given wireless communication system may also include as a component thereof one or more wired networks or portions of such wired networks.

FIG. 1 shows a wireless communication system 100 in an illustrative embodiment of the invention. The communication system 100 comprises a location-based services system 102, which is illustratively referred to herein as a Gcast™ system, where Gcast™ is a trademark of Lucent Technologies Inc. of Murray Hill, N.J., USA. The Gcast™ system 102 receives message information from a marketing message database 104 and subscriber information from a subscriber information database 106, and is coupled to one or more billing gateways 107 and messaging gateways 108 as shown.

Also included in the communication system 100 is a wireless network 110 comprising a number of subscriber devices 112 which communicate with base stations 114. The base stations 114 are arranged in respective cells 115 of the wireless network 110. Although the wireless network 110 is illustratively configured as a wireless cellular network, which may be, for example, an otherwise conventional UMTS network, other types of wireless networks may be used in implementing the invention.

The subscriber devices 112 are illustratively shown in FIG. 1 and elsewhere herein as cellular telephones, and may be viewed as examples of what are more generally referred to herein as mobile user devices. Such devices may also be referred to herein as mobile stations or as simply "mobiles." The invention is not restricted to use with any particular type of mobile user device, and mobile user devices herein may comprise, for example, portable or laptop computers, personal digital assistants (PDAs), wireless email devices, or other portable processing devices, in any combination.

The communication system 100 further includes a computer network 120 that is comprised of multiple computers 121 and is associated with at least one marketing agent 122. The computer network 120 provides marketing information that is stored in the marketing message database 104. Alternatively, the marketing information may be stored directly in the Gcast™ system 102, or partially in the marketing message database 104 and partially in the Gcast™ system 102.

Wireless subscribers 130, which may be users of the subscriber devices 112, provide profile information 132 within communication system 100. This profile information may comprise, for example, opt-in lists or other user preferences, demographic information, or other types of profile information generated from, for example, point-of-sale (POS) questionnaires, responses to billing inserts, service provider (SP) websites, or any other source of subscriber profile information. The profile information may be stored, for example, in subscriber information database 106 and thereby made accessible to the Gcast™ system 102. Alternatively, the profile information 132 may be stored directly in the Gcast™ system 102, or partially in the subscriber information database 106 and partially in the Gcast™ system 102.

It should be noted that at least a portion of the profile information, as well as or alternatively marketing information, location and presence information, or other types of information utilized by the Gcast™ system 102, may be stored on one or more of the subscriber devices 112, or in one or more other system elements. For example, a given subscriber device may store location, presence and profile information for that device, and provide such information to the Gcast™ system 102 on an as-needed basis.

One possible mode of operation of the communication system 100 in the illustrative embodiment is indicated generally by Steps 1 through 5 as shown in the figure. It is to be appreciated that, although the communication system operations in this embodiment are directed towards delivery of advertising messages, the described techniques can be adapted in a straightforward manner for use in delivery of any type of content associated with any type of location-based service. The content can be generated by a variety of different entities, rather than just marketing entities as in the present example, and such other entities may include the subscribers themselves. Also, the particular operations need not occur sequentially in the order shown, for example, certain of the steps may be performed at least in part concurrently with one another.

In Step 1, the computer system 120 associated with marketing agent 122 is utilized to collect advertising content and target profiles for that advertising content. Although only a single networked computer system associated with a single marketing agent is shown in this example, other embodiments may include multiple marketing agents or other types of marketing entities, each having its own computer system.

In Step 2, opt-in lists are built and other types of profile information 132 are collected for the wireless subscribers 130. As indicated previously, this information may be stored in the subscriber information database 106.

In Step 3, subscriber location and presence information in subscriber information database 106 is automatically collected and updated by communication with the wireless network 110. The location information may indicate, for example, the current locations of respective ones of the subscriber devices. The presence information may indicate, for example, whether the user of a given subscriber device is currently participating in an active voice call on that device, or whether the user is in a meeting or otherwise occupied or unavailable.

In Step 4, a rules engine in the Gcast™ system 102 matches marketing messages from the marketing message database 104 to appropriate subscribers based on information stored in the subscriber information database 106.

In Step 5, the messages matched to respective subscribers in the rules engine of the GcaSt™ system 102 are delivered to those subscribers at their respective subscriber devices 112 via one or more of the base stations 114 of the wireless network 110.

Referring now to FIG. 2A, an example of one possible implementation of at least a portion of the communication system 100 of FIG. 1 is shown. In the communication system 100 as shown in FIG. 2A, the Gcast™ system 102 of FIG. 1 is implemented in a network operations center 202 that is separate from the wireless network 110. The network operations center 202 communicates with one or more processing devices of the wireless network 110 via a conventional integrated services gateway (ISG) 204.

More specifically, the ISG 204 communicates with a first processing device 210 comprising one or more of a mobile positioning center (MPC) and a gateway mobile location center (GMLC), and with a second processing device 212 comprising one or more of a short message service center (SMSC) and a multimedia message service center (MMSC). The wireless network 110 in this embodiment further comprises at least one additional processing device 214, which illustratively comprises one or more of a home location register (HLR), mobile switching center (MSC), a position determining element (PDE) and possibly one or more additional elements such as a visitor location register (VLR), serving GPRS support node (SGSN), location services element (LCS), etc. It should be understood that the notation "/" as used in FIG. 2A and elsewhere herein refers generally to "and/or." Conventional operations associated with wireless network elements such as the above-noted MPC, GMLC, SMSC, MMSC, HLR, MSC, PDE, VLR, SGSN and LCS are well known to those skilled in this art, and are therefore not described in detail herein.

A given one of the processing devices 210, 212 and 214 in wireless network 110 may be implemented as one or more computers, servers, switches, storage elements or other elements in any combination. Generally, such processing devices comprise at least one processor coupled to at least one memory, and can be configured to execute software programs for providing functionality associated with the techniques described herein. Although particular network elements such as MPC, GMLC, SMSC, MMSC, HLR, MSC and PDE are shown in FIG. 2A as being associated with particular ones of the processing devices 210, 212 and 214, this is by way of illustrative example only. In alternative embodiments, each such network element may be implemented using one or more dedicated processing devices, or other combinations of these elements may be implemented using one or more shared processing devices. The term "processing device" as used herein is therefore intended to be construed generally, so as to encompass any processor-based device suitable for use in providing at least a portion of the functionality associated with a given location-based service.

The Gcast™ system 102 in the FIG. 2A embodiment comprises an arbitrary number N of processing devices, denoted 220-1 through 220-N. As indicated above, each such processing device may be implemented as one or more computers, servers, switches, storage elements or other elements in any combination. For example, one of the processing devices 220 may comprise a web server accessible over a network. Also, although the Gcast™ system is shown in FIG. 2A as comprising multiple processing devices 220, in alternative embodiments, the Gcast™ system may be implemented using only a single such device. Again, as indicated previously, such a processing device generally comprises a processor coupled to a memory.

The term "location-based services system" as used herein is intended to encompass, for example, the Gcast™ system 102 of FIGS. 1 and 2A, or any other arrangement of one or more processing devices, each comprising at least one processor coupled to at least one memory. A given such system may be implemented internal to a wireless network, that is, within a base station or other element of that network, or external to the wireless network. The system may alternatively be implemented in a distributed manner, with portions being internal to the wireless network and other portions being external to the wireless network. Moreover, a location-based services system may be configured to include one or more of the system components that are shown in FIG. 1 or 2A as being external to the Gcast™ system 102. For example, elements such as one or more of the computers 121 associated with marketing agent 122 in FIG. 1, or one or more of the processing devices 204, 232 or 235, may be part of a given location-based services system in an alternative embodiment.

Information passed between the Gcast™ system 102 and the wireless network 110 via the ISG 204 includes, in the present example, locations of the mobile subscriber devices 112, as indicated by dashed line 224 between processing device 210 and the Gcast™ system 102, and messages targeted to respective ones of the subscriber devices 112, as indicated by dashed line 225 between processing device 212 and the Gcast™ system 102. Although ISG 204 is used as an interface between the Gcast™ system 102 and the wireless network 110 in this embodiment, other types of interfaces may be used in other embodiments.

The Gcast™ system 102 is also coupled in this example via an Internet protocol (IP) network 230 to at least one computer 232 which is equipped with a web browser 234. The web browser 234 may be used, for example, to access a map server 235 over the IP network 230. Other types of web servers can also be accessed, in a conventional manner, via the web browser 234 of the computer 232. One of such servers may be a web server implemented within the Gcast™ system itself, using one or more of the processing devices 220. The computer 232 may be, for example, one of the computers 121 of the marketing agent computer system 120 in FIG. 1. The marketing agent is also referred to as an advertising service provider (AdSP) or advertising campaign manager in this embodiment. Alternatively, such a computer, or another similar computer of other processing device, may be associated with a system administrator, an entity of the wireless service provider, or a particular one of the subscribers. Of course, each such entity may have its own browser-equipped computer or computers in a given embodiment of the invention.

Referring now to FIG. 2B, a more detailed view of one possible interconnection of certain elements of the system 100 is shown. In this embodiment, a base station 114 communicates with a mobile user device 112 and an MSC 250 as shown. The MSC 250 is coupled to PDE 252 and MPC 254. The MSC 250 is also coupled to SMSC 256, HLR 258 and VLR 260 as shown. MPC 254 interacts with one or more LCS elements 262. Advertising content and other types of location-based service content are accessible in this embodiment from element 264, illustratively designated in the figure as an ad content element, via SMSC 256 and MSC 250. Element 264 may represent a component of the Gcast™ system 102 or other component of communication system 100. Again, conventional aspects of the operation of wireless network elements such as those shown in FIG. 2B are well known, and therefore will not be described in detail herein. Also, numerous alternative arrangements of wireless network elements may be used in other implementations of the invention. For example, in alternative embodiments the PDE may be eliminated and the position determination or other type of mobile user device location measurement may be performed entirely within the mobile user device itself.

The LCS element 262 in FIG. 2B may implement at least a portion of the Gcast™ system 102 in the illustrative embodiment. Thus, the Gcast™ system 102 may be viewed as an otherwise conventional LCS element suitably modified to incorporate one or more aspects of the location-based services techniques described herein. Such an LCS element may, but need not, reside within the wireless network 110. Although shown as communicating with the MPC 254 in FIG. 2B, the LCS element in other embodiments may communicate directly with other system elements, such as, for example, MSC 250, PDE 252, SMSC 256, etc.

As will be described in greater detail below, the Gcast™ system 102 proactively delivers messages to subscribers based on a combination of location, presence and profile information. As noted above, the location information may indicate, for example, the current geographic location of the subscriber device 112 associated with a particular subscriber, while the presence information may indicate, for example, whether the particular subscriber is currently participating in an active voice call on the subscriber device. It was indicated previously that other types of presence information may include, for example, indications as to whether the subscriber is in a meeting or otherwise occupied or unavailable. The profile information, also as indicated previously, may comprise subscriber preferences, demographic information, and the like.

The messages in the illustrative embodiments may comprise "push" messages, and include advertisements or any other type of content that may be targeted to one or more subscriber devices in conjunction with the provision of location-based services. Thus, as a more particular example, the messages may comprise push advertisements directed to all subscriber devices currently located within a given zip code or other specified geographic area, not participating in an active voice call, and assigned to subscribers fitting a particular user preference and target demographic profile.

Figure 3:
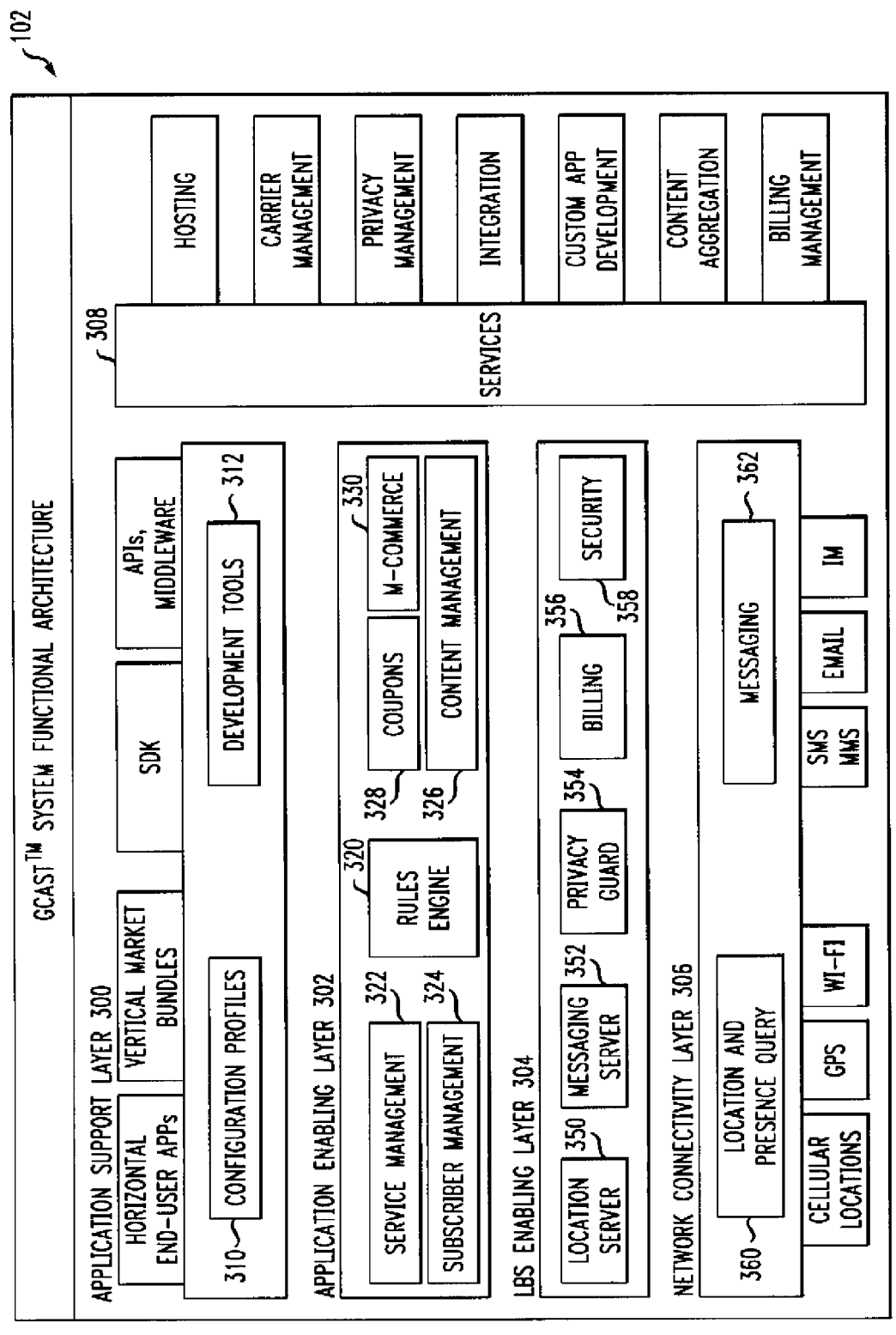
FIG. 3 shows a more detailed view of the location-based services system of the FIG. 1 wireless communication system.

FIG. 3 shows the Gcast™ system 102 of FIGS. 1 and 2A in greater detail. It is to be appreciated that the particular elements shown within Gcast™ system 102 in this embodiment are presented by way of example only, and other embodiments may comprise a subset of the illustrative elements as well as additional or alternative elements not shown. Also, numerous alternative location-based services system architectures may be used in implementing the invention.

The Gcast™ system 102 as shown in FIG. 3 comprises a number of layers, including an application support layer 300, an application enabling layer 302, a location-based services (LBS) enabling layer 304 and a network connectivity layer 306. Also included are services components 308 illustratively comprising hosting, carrier management, privacy management, integration, custom application development, content aggregation and billing management.

The application support layer 300 comprises configuration profiles 310 and development tools 312. The configuration profiles 310 may be associated with, for example, horizontal end-user applications, vertical market bundles, or other types of configuration information. The development tools may comprise software development kits (SDKs), application programming interfaces (APIs), middleware, etc.

The application enabling layer 302 allows applications to be written which can make use of the location-based service capabilities of the Gcast™ system 102 across diverse networks to provide context-sensitive targeted messages. The application enabling layer 302 comprises the above-noted rules engine 320, for matching messages from marketing message database 104 with appropriate subscribers whose information is stored in the database 106, as previously described in conjunction with FIG. 1. Other elements of the application enabling layer 302 include a service management component 322, a subscriber management component 324, and a content management component 326, the latter being associated with additional components including electronic coupons 328 and mobile commerce (M-commerce) component 330. The M-commerce component 330 supports the provision of electronic commerce applications, such as online shopping, via mobile user devices of the system.

The LBS enabling layer 304 comprises a location server 350. The location server is advantageously configured to minimize the number of location queries generated in the wireless network by, for example, eliminating duplicate queries and prioritizing queries based on the importance of the applications making those queries. Other components of the LBS enabling layer include a messaging server 352, a privacy guard component 354, a billing component 356 and a security component 358.

The network connectivity layer 306 comprises a location and presence query module 360 and a messaging module 362. The location and presence query module works across diverse types of wireless network technologies to obtain user location and presence information. For example, in this embodiment, it can obtain location and presence information using cellular triangulation techniques such as Advanced Forward Link Trilateration (AFLT), global positioning system (GPS) techniques such as assisted GPS (AGPS), and IEEE 802.11 (Wi-Fi) techniques, although as indicated previously, location and presence information determination for other types of wireless networks can also be supported. The messaging module delivers and receives messages across a variety of media, such as, for example, short message service (SMS), multimedia message service (MMS), Email, instant messaging (IM), etc.

The Gcast™ system 102 can be utilized to implement a wide variety of location-based services, including geographic messaging, in-store coupons, user-defined lifestyle alerts, and event-related marketing, as will now be illustrated in conjunction with FIGS. 4A, 4B, 4C and 4D, respectively. It should be understood that these are merely examples, and numerous other types of location-based services can be provided in a particularly efficient manner using the Gcast™ system 102.

Figure 4A:
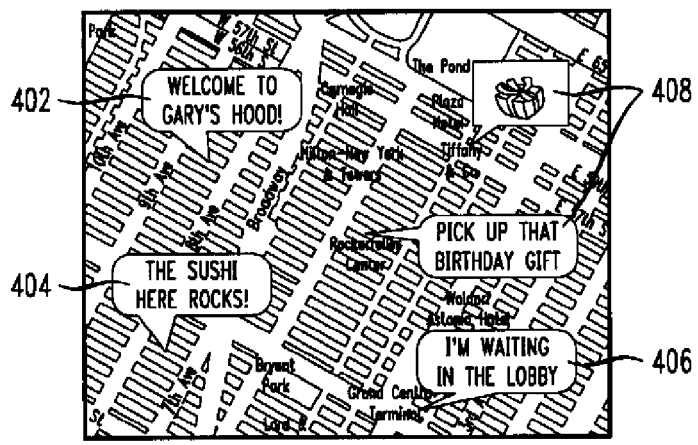
FIGS. 4A through 4D show examples of location-based services that may be provided by the location-based services system of FIG. 3 in the wireless communication system of FIG. 1.

FIG. 4A shows an example of the above-noted geographic messaging service, also referred to herein as GMS™, where GMS™ is a trademark of Lucent Technologies Inc. of Murray Hill, N.J., USA. Generally, in the GMS™ service, a sender submits messages to the system for delivery to a recipient, with the delivery occurring when the subscriber device 112 of that recipient enters a designated location. Messages may be submitted, by way of example, from one of the subscriber devices 112, from a computer such as computer 232, or from another system element. Examples shown in FIG. 4A include a welcoming message 402, a restaurant recommendation 404, a waiting notice 406 and various errand reminders 408. It should be noted that the sender and the recipient may be the same subscriber. That is, a given subscriber may wish to receive a reminder to pick up something when he or she enters the vicinity of a particular store. That subscriber can submit a GMS™ message from his or her subscriber device for delivery back to that subscriber device when it enters the appropriate geographic location. Of course, numerous other types of GMS™ messages can be supported based on combinations of location, presence and profile information. Also, the message may incorporate additional information, such as relevant portions of one or more maps retrieved from the map server 235. A subscriber may be charged a flat fee per month for use of the GMS™ service, or may be charged per GMS™ message submitted. Other pricing models may also be used, for example, the pricing may be subsidized by marketing messages incorporated in or otherwise added to the GMS™ messages.

Figure 4B:
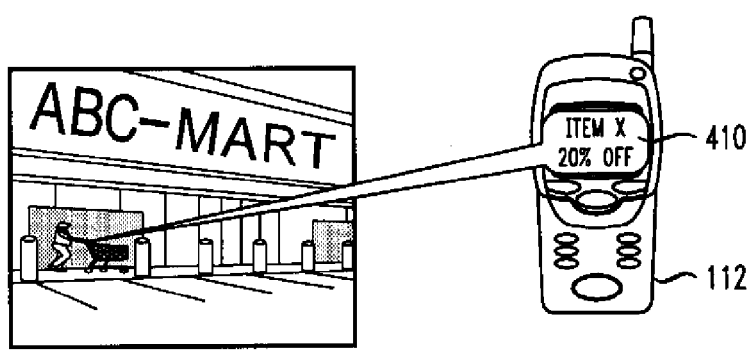

Referring now to FIG. 4B, an example of a location-based service involving in-store electronic coupons is shown. In this example, a merchant delivers electronic coupons to the subscriber devices of opted-in customers upon those customers entering the vicinity of the store. The coupon may be in the form of a message 410 presented on the display of a given subscriber device 112 as shown. Coupons are selected based on customer profiles, such as profile information 132 in system 100. Possible pricing models for this exemplary service may involve merchants paying a flat fee per coupon delivered, merchants paying a fee per coupon redeemed, or other arrangements.

Figure 4C:
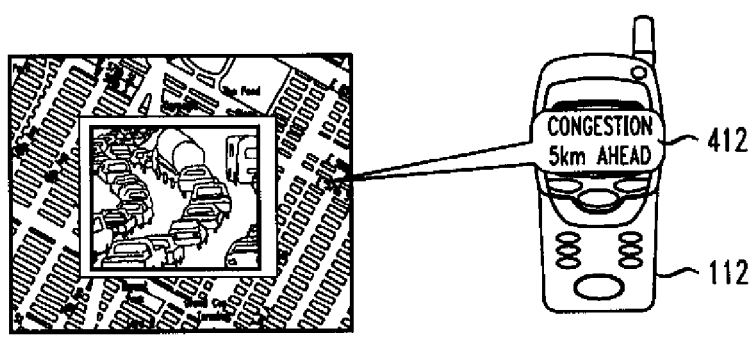

FIG. 4C shows an example of the above-noted lifestyle alerts service. In this example, subscribers are alerted regarding traffic and weather-related incidents around their current location or on their expected path ahead. A given alert 412 is presented to a subscriber on his or her associated subscriber device 112. As in the other examples described above, the message may incorporate additional information, such as maps from the map server 235. A typical pricing model would be a flat monthly fee charged to subscribers for the service. Advertisements may be included with the alerts in order to partially or completely subsidize the service for subscribers.

Figure 4D:
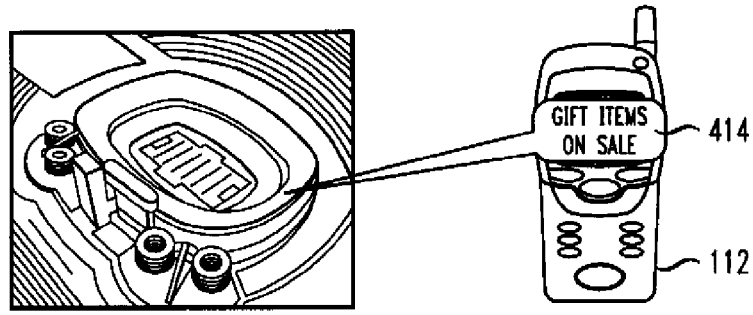

An example of an event-related marketing service is shown in FIG. 4D. In this example, an event organizer or merchant at a sporting event, concert or other type of event sends marketing or other informational messages to the subscriber devices of an opted-in audience of subscribers. The content may be customized to the profiles of respective subscribers. As an example, a message 414 indicating gift items on sale may be presented on the display of a subscriber device 112 located within a stadium or other event venue. More particular examples may include messages such as "Reply to this message to buy an MMS clip of the goal just scored and forward it to your friends" or "New York Yankees® T-shirts on sale for the next 30 minutes." Again, possible pricing models may involve charging merchants per message delivered, with higher prices for completed transactions.

As mentioned previously, numerous other location-based services may be implemented in an efficient manner using the Gcast™ system 102 of the illustrative embodiments. One advantage of these embodiments is that the number of location queries and other types of location-related communications required between the base stations 114 and the subscriber devices 112 can be reduced, while still allowing implementation of a wide variety of location-based services within the communication system 100. The Gcast™ system 102 is thus configured to prevent location-related communications from overwhelming the wireless network 110 and interfering with the primary voice and data traffic functionality of that network.

Examples of techniques for reducing the number of location-related communications will be described in a number of separate sections below, including sections denoted Prioritizing Location Queries, Traffic-Synchronized Location Measurement, Mobile-Initiated Location Measurement, Broadcast Channel Delivery of LBS Information, and Reverse Lookup. Before these sections are presented, a number of additional features of the Gcast™ system 102 will be described. These features are described in the following sections entitled Auctioning of Message Delivery Opportunities, and User Movement Statistics. In a final section, a number of exemplary location measurement techniques are presented, including a trajectory method, an expanding-disk method and a nucleation-area method.

Auctioning of Message Delivery Opportunities

The communication system 100 as illustrated in FIGS. 1 and 2 may be configured to permit auctioning of message delivery opportunities, so as to provide an additional source of revenue in the system. In an embodiment of this type, the Gcast™ system 102 allows marketers or other interested parties to bid on particular available slots or other opportunities for delivery of marketing messages to subscriber devices 112. Assuming for purposes of illustration that a fixed number of messages belonging to certain categories (e.g., coffee ads) can be delivered in a given location (e.g., a mall) at a given time (e.g., Sundays), a given message delivery opportunity comprising a specified category-location-time combination can be bid for by the parties interested in pushing the messages (e.g., various coffee advertisers). The Gcast™ system may make use of real time and historical information about the popularity of a given location-category-time combination to facilitate the bidding for the corresponding message delivery opportunity. Other types of message delivery opportunities can be auctioned in a similar manner, for example, opportunities based on location-category, category-time or location-time combinations.

A message delivery opportunity auction of the type described above can be controlled at least in part via software running on one or more of the processing devices 220 of the Gcast™ system 102. Such software may include, for example, a bidding engine and a corresponding web site that allows interested parties to access the bidding engine via respective computers or other devices coupled to IP network 230. Such devices may be browser-equipped devices similar to computer 232. The auction may occur in real time, for example, based on the current number of messages that can be delivered to subscriber devices 112 in wireless network 110. Alternatively, the auction may be based on an estimated count of messages that can be delivered at some future point in time.

User Movement Statistics

The communication system 100 may also or alternatively be configured to determine user movement statistics and to utilize such statistics to facilitate delivery of marketing messages or other types of messages to subscribers. For example, such statistics may capture the flow of users in conjunction with their profile information. This would allow the system to determine how many users of certain profiles are likely to be in a given area in a given period, and such information can be used to facilitate the establishment of advertising campaigns by marketing agents in the system. For example, the movement statistics would allow an advertiser to create a campaign to deliver advertisements to opted-in subscribers with matching profiles entering a given region in a given period of time (e.g., males between 15 and 25 within 1 mile of a mall on Sundays), while providing the advertiser with an a priori estimate of the likely success of the campaign.

In operation, the communication system 100 may obtain profile information for users associated with respective subscriber devices 112 of the wireless network 110, obtain location information for the subscriber devices 112, and generate user movement statistics based on the location and profile information. The system then controls the delivery of at least one message to a given one of the devices based on the user movement statistics.

The statistics may be used, for example, to estimate the impact of a marketing campaign, to determine prices charged to advertisers for message delivery, or to establish appropriate bid levels for the above-noted auction of message delivery opportunities. The statistics may be computed at least in part using the location, presence and profile information stored in subscriber information database 106, as such information is routinely gathered and updated in conjunction with the message delivery functions of the communication system.

Prioritizing Location Queries

As noted previously, an aspect of the present invention relates to the prioritization of location queries in the communication system 100. This prioritization, which may be implemented using the location server 350 of the LBS enabling layer 304 in Gcast™ system 102 as shown in FIG. 3, will now be described in greater detail.

Conventional systems comprising wireless network elements such as the above-noted MPC and GMLC utilize such elements to determine the locations of the mobile devices 112. For example, location-based service applications may query these network elements in order to obtain mobile device locations when needed. Location-based service applications typically query the network elements for device locations on demand, in an approach commonly referred to as forward lookup (FL). In the FL approach, the network elements typically page the mobile user devices in order to determine their respective locations. Thus, the paging channel carries a large burden, since a given mobile device has to be paged every time a location measurement involving that mobile device is performed, and this paging often has to be performed over a large network area involving many cells. However, the conventional systems are deficient in that the number of location queries that can be supported within a given period of time is often very small, on the order of about 5 to 30 queries per second. While this number of location queries may be sufficient for low-throughput applications such as emergency 911 services, it is inadequate for location-based services that involve, for example, substantially continuous monitoring of subscriber device locations to support the delivery of push messages such as advertisements.

The communication system 100 of FIG. 1 is advantageously configured in an illustrative embodiment to provide improved scalability of location-based services, while minimizing any revenue losses incurred by not delivering a message. This embodiment utilizes a software algorithm for scheduling user location queries such that users whose locations are "less beneficial" to the corresponding location-based services application are queried less frequently than others. This is an example of an arrangement in which users associated with respective mobile user devices of the system are separated into at least first and second groups of users having respective first and second benefit classes.

The various benefit classes may be defined based on respective perceived benefits to a provider of a given location-based service, or using other techniques. An approach of this type, in which different benefit classes are defined based on perceived benefit to a service provider or other types of benefit quantification, uses the benefit classes to determine how often particular mobile user devices are queried for their locations. Such approaches provide significant advantages relative to conventional FL approaches, and are also referred to herein as "smart lookup" approaches. The reverse lookup approach described in greater detail below may be viewed as another type of smart lookup.

The benefit of a user location response may be defined, for example, as the ability to send an advertisement or other revenue-generating message to the user. As described elsewhere herein, such messages may be sent based on a match between the message and the user based on a combination of location, presence and profile information. The software algorithm, which may be part of the above-noted location server 350, may utilize location information for a given user to prioritize location queries. This allows the system to handle a larger number of users for a given network throughput while also minimizing revenue losses. As a result, scalability of location-based service applications is improved while deployment cost is reduced.

The location information utilized to prioritize location queries may be obtained, for example, using the trajectory method, expanding-disk method or nucleation-area method described below, or using other location measurement techniques. As a more particular example, the location information may comprise a probability that a particular user will be in a particular geographic area at a particular time.

Traffic-Synchronized Location Measurement

As described above, the conventional FL approach does not scale well for location-based service applications that involve frequent monitoring of mobile user device locations. This is attributable to the limited capacity of the paging channel, as well as the limited throughput of wireless network elements such as the MPC and GMLC.

In an illustrative embodiment of the communication system 100, this problem is further alleviated by the provision of traffic-synchronized location measurement. Generally, such an approach involves automatically performing location measurements for any of the mobile user devices that are currently active on a traffic channel within the wireless network 110. This advantageously synchronizes location measurement initiation with traffic channel activity.

The location measurements can be performed using techniques such as AFLT, AGPS or others, as well as combinations of such techniques. The traffic channel may be associated with a voice call, an SMS message, an MMS message, or any other type of communication. The term "traffic channel" in this context is therefore intended to be construed broadly. The mobile user device location measurement data can be sent over the reverse link of the traffic channel. The forward link of the traffic channel can be used, for example, to forward satellite information or other assist data for AGPS. This traffic-synchronized location measurement advantageously leads to higher scalability of location-based service applications at a lower cost.

One possible implementation of the above-described traffic-synchronized location measurement feature in the communication system 100 will now be described in greater detail, with reference again to FIG. 2B. In this particular implementation, a location measurement session is initiated by the MSC 250 of FIG. 2B. The location measurement session can alternatively be initiated by another wireless network element, such as the above-noted SGSN. The initiation may occur, by way of example, upon setup and/or teardown of the traffic channel. Other possible circumstances for initiating a location measurement session include when a cell identifier (ID) of the mobile user device has changed or a corresponding active set has changed, both of which can be interpreted as an indication that the mobile user device has moved sufficiently to justify a new location measurement.

The MSC 250 initiates the location measurement session by sending a location measurement request to the MPC 254. This request contains information such as a mobile user device ID, user ID and cell ID.

The MPC 254 forwards the location measurement request to at least one LCS 262, which compares the user ID to information in an associated database. The LCS reports back to the MPC if a match was found and if the location measurement session is approved. Reasons for non-approval can be that the subscriber has denied location measurements, or that the LCS has just obtained a location update for this subscriber.

Assuming that a match was found and approval of the appropriate LCS 262 is obtained, the MPC 254 sends the location measurement request to the PDE 252. The PDE initiates the location measurement via the MSC 250 and the appropriate base station(s) 114 utilizing the traffic channel that is already available. The mobile user device 112 sends location measurement data back to the PDE along the same channel. The PDE determines the location based on the mobile user device measurement data, and reports the results to the MPC. The MPC in turn sends the results to the LCS that approved the location measurement session.

In another possible implementation, the MSC 250 or other wireless network element may perform the location measurement via triangulation utilizing roundtrip delay data obtained in a conventional manner.

In yet another possible implementation, the mobile user device 112 itself, rather than the MSC 250 or another wireless network element, automatically initiates the location measurement process.

Those skilled in the art will recognize that numerous alternative processes other than those described above may be used to implement traffic-synchronized location measurement in accordance with the present invention.

It is to be appreciated that the traffic-synchronized location measurement feature of a given embodiment of the invention can be implemented using otherwise conventional standard communication protocols. For example, in a communication system comprising a CDMA2000 wireless network, the above-described location measurement process may closely follow the protocols set forth in the associated standards documents, including, for example, CDMA2000-Access Network Interoperability Specification (3GPP2 A.S0001-A V2.0), CDMA2000-TIA/EIA Location Services Enhancements (3GPP2 X.S0002.0 V1.0), and CDMA2000-Wireless Intelligent Network Support for Location-Based Services (3GPP2 X.S0009-0 V1.0), all of which are incorporated by reference herein.

The traffic-synchronized location measurement approach described above avoids the need to page the mobile user devices independently for location measurements, thereby substantially reducing the paging channel overhead. It also allows location-based services information to be communicated in conjunction with data sessions, for example, during or right after completion of data sessions or voice calls. Under such circumstances, the subscriber typically pays an elevated degree of attention to his or her mobile user device and is therefore more likely to perceive the location-based service message and to react to it. Moreover, since the location measurements are relatively inexpensive when performed over an existing traffic channel, they can easily be repeated when the mobile device has undergone a handover to another cell. This has the additional advantage that the mobile device location can be tracked and the associated information stored in a subscriber database such as database 106 for reference at later times, for instance, to derive user mobility patterns or other types of user movement statistics.

Mobile-Initiated Location Measurement

A given embodiment of the invention may be configured such that one or more of the mobile user devices autonomously performs location measurements. For example, when its location has substantially changed, it may request a location readout session from the wireless network. In this session, the location measurement data are forwarded to the LCS. This approach is particularly well suited for use with mobile user devices that are in an idle state.

In one possible implementation of a mobile-initiated location measurement technique, the mobile user device determines its location via GPS or AGPS. For AGPS, the mobile user device requires satellite information or other assist data to be forwarded from a cell in its vicinity. For that purpose, all cells may broadcast the corresponding satellite information or other assist data via a paging channel or other type of broadcast channel, as will be described in greater detail below. The frequency of location measurements can be set at the mobile user device, provided via so-called "third-layer" messaging to the mobile user device when powering-up, provided by a default, or provided using other techniques.

When the mobile observes a sufficient location change, it requests a location readout session from the network. For that purpose, it sends a burst on the access channel to the MSC 250 of FIG. 2B with a request to setup a traffic channel for location readout. This process can be implemented in a manner compliant with existing communication standards, such as the CDMA2000 standards referred to previously herein.

The MSC 250 performs the routine protocol steps for traffic channel setup. It further provides the mobile user device ID and user ID to all LCSs 262 that provide location-based services to the mobile user device. The LCSs compare the user ID to the subscriber database and reply with an acknowledgement or denial. If at least one LCS has acknowledged the location readout session, the MSC sends a location measurement readout command to the mobile user device. The mobile then returns the location measurement data to the MSC. The MSC forwards the location measurement data to the particular LCSs. The MSC can also keep a copy of the location measurement data in its database for future reference, for example, in order to handle reverse lookup requests from one or more of the LCSs.

The use of mobile-initiated location measurement can facilitate the scaling of location-based services and reduce deployment costs. It can reduce paging channel overhead, and also reduce the signaling overhead between wireless network elements such as the MSC, LCSs, base stations and mobile user devices.

Broadcast Channel Delivery of LBS Information

The communication system 100 of FIGS. 1 and 2 may be configured such that content-identifying information or other types of location-based service information are transmitted to the mobile user devices over a paging channel or other type of broadcast channel. The content-identifying information may comprise information that identifies particular types of location-based service content that are available to the mobile user devices, such that a given mobile can autonomously select the particular available location-based service content it wishes to have delivered. Other types of location-based service information that can be delivered using a paging channel or other type of broadcast channel comprise, for example, assist data for use in an AGPS location process. Again, this feature facilitates scalability of location-based service applications, while reducing deployment costs.

As an illustration, consider a situation in which all the subscribers in a given cell 115 of the wireless network 110 want to initiate a location measurement. Since the assist data for all of the subscribers in a common cell is the same, a paging channel or other type of broadcast channel could be used to deliver the assist data for AGPS. The returned location measurement information may still be delivered over traffic channels, although other types of channels, such as an access channel, may also be used for this purpose. This approach would advantageously reduce the time that the mobile user devices spend on the traffic channels and eliminate use of the traffic channels for the assist data transmission.

In another example, the above-noted paging channel or other type of broadcast channel may be used to deliver advertisements, electronic coupons or other location-based service content to mobile user devices in a common cell or other common geographic area. A given mobile user device may then store such broadcast content locally in its internal memory and automatically retrieve portions of the content at appropriate times as determined, for example, based on a combination of location, presence and profile information. An arrangement of this type can advantageously avoid the need for any use of the traffic channel in delivering location-based service content.

The location-based service content may be transmitted on a paging channel or other type of broadcast channel that is separate from that used to transmit the assist data for AGPS.

In an arrangement in which content-identifying information is transmitted over a paging channel or other type of broadcast channel, the information may be in the form of a table of contents or other type of content summary. A given content summary may comprise information such as a content provider ID, a content reference ID, a content classification ID (e.g., can refer to alerts, ads, social networking groups, etc.), a geographical target location (e.g., minimum latitude, maximum latitude, minimum longitude, maximum longitude, etc.), and a time frame of validity (e.g., start time, end time, etc.).

As a more particular example, the content-identifying information may be transmitted over a slotted paging channel in the form of a linked list of content summaries. The list may start in one particular slot. This particular slot may be the same for all cells in an area controlled by the MSC and can be advertised to the mobile user devices via a third-layer message or other type of message delivered when the mobile user devices power up or otherwise access base stations in the MSC area. Several content summaries may be fit into one slot. The last content summary in a given slot may be followed, for example, by a list termination flag or by a pointer to the next slot, where the list is continued.

The content summaries may change from one cell to the next, such that each cell presents summaries of only the content available in its particular coverage area. This reduces the overall paging overhead. However, since mobiles user devices often move from cell to cell very frequently, it may be desirable in some applications to present summaries of content available over areas comprising multiple cells. These areas could match the location areas used for conventional mobile user device paging services, or other types of services. For example, a mobile user device may determine that it has entered an area with a different set of content summaries by making use of one or more of the above-noted content-related IDs. Such IDs may be transmitted as header information with the content summaries.

This header can also include other information, such as the time when the last update occurred. A given mobile user device would then have to decode the entire list only when updates have occurred or upon entering an area with different content-related IDs, which conserves mobile user device battery power. The header could also provide information which identifies the paging channel slots having content summaries that have been updated. This increases the overhead, but it allows mobile user devices to perform selective decoding, which is faster and, again, saves battery power.

Using the content summaries and its own location measurement, the mobile user device can determine if any of the available location-based service content is suited for the subscriber. If the mobile user device has found such a match, it sends a message to the appropriate content provider and requests the delivery of the corresponding content. In this message, the mobile user device may also provide a subscriber ID and/or other information to the content provider for authentication purposes. This authentication may be performed in addition to a standard authentication performed with the wireless network upon request of a traffic channel. If the authentication is successful, the LCS or other system element returns the requested location-based service content to the mobile user device.

The mobile user device may be provided with a content selection algorithm that determines, for example, how often location measurements are to be performed, what the filter criteria are for selection from available location-based service content, and other information relevant to the content selection process. Such an algorithm may be similar to a conventional FL algorithm, and downloaded from the network or a third-party provider. Alternatively, the algorithm could be determined at least in part by the subscribers themselves. For example, a given subscriber could define various selection criteria through interface commands. The subscriber may also be permitted to turn off all location-based service content features at the mobile user device with or without having a connection to the network. This allows complete decoupling between location-based service provision and content selection, thereby providing a high level of security to the subscriber.

As another example, a subscriber may be permitted to select location-based service content for particular locations where he or she is not currently present. This allows the subscriber to participate in activities at other locations. If alerted responsive to such selections, he or she can either decide to travel to that area or call a friend or family member in that area to participate in the activity (e.g., take advantage of coupons, sales, offers, etc).

As yet another example, enterprises can provide location-based services for their employees. Such services can be matched specifically to the needs of the enterprise and functions of particular employees.

A content selection algorithm of the type described above can be configured to search and display content alerts only when the subscriber is using the terminal. This ensures that the available location-based service content is made apparent at a time when the subscriber is paying attention to the device. It also saves battery power since it may allow the device to return to a dormant state at other times. Since the content selection algorithm in this embodiment is assumed to be resident on the mobile user device, it can react to device activity even when the device is not active on a call but is instead used for other purposes, for example, when the subscriber checks an address book, a calendar, a time display, etc.

Reverse Lookup

Another feature that may be implemented in the communication system 100 of FIGS. 1 and 2 is referred to herein as "reverse lookup" or RL. As indicated above, the conventional FL approach is problematic in that it limits scalability of location-based services, and can place excessive demands on the traffic channels and other resources of the wireless network. The RL approach to be described below advantageously overcomes the problems associated with the conventional FL approach. Like the other features described previously, this feature can provide higher scalability of location-based services at reduced cost.

Generally, the RL approach involves limiting FL location requests based on information that is readily available at a given wireless network element such as the LCS 262 of FIG. 2B, such that the actual number of executed location requests is substantially reduced.

A first illustrative example of the RL approach involves identifying users that are registered in the HLR 258 and/or VLR 260 of FIG. 2B. More specifically, a list of currently-registered users can be obtained from the HLR/VLR, and processed to identify one or more users that have been recently active in a given location of interest. This information can then be utilized, for example, to send messages or other location-based service content to particular users right away, or to identify a reduced set of users for which FL location requests will be executed. The list of currently-registered users can be obtained, for example, via a batch lookup initiated by the LCS 262 or another wireless network element.

The above-described RL example based on identification of users registered in the HLR/VLR can advantageously eliminate the need to execute FL location requests for those users that are not available for location-based services at a particular point in time, for example, because they are roaming in another network, have their mobile devices powered down, are in a coverage hole, etc. This type of RL also facilitates the provision of location-based services to roaming users, for example, users that are visiting wireless network 110 from other wireless networks.

In another possible implementation, the RL process may be based on signaling data records obtained from the MSC 250 or another wireless network element that maintains such information. For example, roundtrip delays between a given mobile user device 112 and multiple base stations 114 of the wireless network are often used to determine the mobile location via AFLT or other type of cellular triangulation. These roundtrip delays can be obtained, for example, from channel cards or other components at each serving base station, and can be forwarded to the MSC or any other wireless network element. Further, a pilot strength measurement message (PSMM) contains information about the relative roundtrip delays between secondary and primary serving base stations. The PSMM is frequently provided by the mobile user device during a call. These and other types of signaling data can be recorded together with other relevant information, as for instance, mobile user device ID, cell ID, time stamp, etc.

The resulting signaling data records can be forwarded to the LCS 262 or another wireless network element after certain time periods, upon request, or whenever an update has occurred, and stored in an associated database, for example, subscriber information database 106. The database can then be queried prior to delivery of location-based service content in order to eliminate certain users from consideration based on the signaling data records and thereby limit the number of FL location requests that are needed.

Again, this type of RL approach can substantially reduce the number of FL location requests that are executed. It avoids unnecessary FL location requests for registered mobiles that have insufficient coverage. Also, the resource savings increase with the amount of traffic calls, in that the higher the network load, the more signaling data is available and the fewer FL location requests that need to be executed. Further, this approach facilitates the delivery of location-based service content to a mobile user device during or immediately following a call, at which time the targeted subscriber will likely be more attentive to the device.

As an estimate of the savings in FL location request execution that can be achieved using the RL approach, assume that one FL location request per subscriber per hour would normally be executed. Further assume that the likelihood that the subscribers will be active on a call in a particular hour is around 80% and the likelihood that the subscribers will send or receive an SMS is around 40%. The combined likelihood for subscribers to have a traffic channel up during the particular hour is $1-(1-0.8)*(1-0.4)=88\%$. If these subscribers can be located via the RL approach, the remaining FL location request requirements have been substantially reduced, to $100\%-88\%=12\%$.

A given RL implementation in accordance with this aspect of the invention may be based on other types of available information, rather than just HLR/VLR registrations or signaling data records as in the above examples.

The foregoing sections entitled Prioritizing Location Queries, Traffic-Synchronized Location Measurement, Mobile-Initiated Location Measurement, Broadcast Channel Delivery of LBS Information, and Reverse Lookup disclose exemplary techniques for reducing the number of location-related communications in the Gcast™ system 102. It should be understood, however, that other types of reduction techniques may be used. Also, the particular features described in the Auctioning of Message Delivery Opportunities and User Movement Statistics sections above are just a few of the advantageous features that may be provided by a given implementation of the Gcast™ system 102.

In the following section, examples of particular location measurement techniques suitable for use in conjunction with the Gcast™ system 102 are described in greater detail. These techniques include a trajectory method, an expanding-disk method and a nucleation-area method.

Location Measurement Techniques

It will be assumed for purposes of illustration that the location measurement techniques to be described below are implemented in a location estimation engine that utilizes a data structure to store location measurement data. The data structure may be internal to the location estimation engine, external to the location estimation engine, or may comprise a combination of internal and external data.

The location estimation engine may be implemented at least in part in software running on a processing device of the system 100. For example, the location estimation engine may be part of a system element such as the LCS 262 of FIG. 2B, or may be distributed across multiple system elements in the embodiments previously described. At least a portion of its operations may be implemented using elements such as the location server 350 and location and presence query module 360 of FIG. 3.

The data structure utilized by the location estimation engine may comprise measurement data for each user, including, for example, one or more of a time stamp; an availability flag; location data such as latitude, longitude, and location accuracy radius; a velocity flag indicating a derived velocity from two consecutive location measurements; an explicit velocity value from AGPS or an indication of no reliable value; a vector of average velocity, averaging time frame and speed accuracy; an acceleration flag indicating a reliable value or no reliable value; and a vector of average acceleration and averaging time frame.

The data structure may also comprise nucleation areas for each user, including, for example, one or more of time data such as time bin index (k), start time and end time; geographic area data such as geographic bin (i, j, step index s), bounding box of bin (SW, NE) and area size; and probability of finding a user in a nucleation area. These data may be provided separately for workdays and weekends, or for other arrangements of different time periods.

The data structure may further comprise availability areas for each user, including, for example, one or more of time data such as time bin index (k), start time and end time; and probability that the user is available in this time frame. Again, these data may be provided separately for workdays and weekends, or for other arrangements of different time periods.

Other types of data that may be present in the data structure include accumulate data such as geographic distribution of speed and geographic distribution of acceleration; and global data such as location-prediction confidence level, average and/or worst-case user speed, typical or average user acceleration, temporal and geographic bin sizes and/or bin expansion sequence, nucleation-area cutoff parameter $\alpha$, lowest lookup rate and non-availability lookup rate, etc.

It is to be appreciated that other types of data structures may be used in implementing the present invention.

The location estimation engine in this illustrative embodiment provides an estimate of the location of a mobile user device at a given time. Parameters passed to this location estimation function may be user identifier and time stamp. In the following, it is assumed that the time stamp always refers to the current time.

The location estimation function returns a set of location areas with the corresponding probabilities to find the particular user $\{LA, P_{LA}\}$. This set can be empty. The location areas are either specified as circular disks (e.g., center, radius) or as rectangles (e.g., southwest, northeast). The probabilities are larger than zero and add up to a value smaller than or equal to one:

$$P_{LA} \in (0, 1], \sum_{LA} P_{LA} \leq 1.$$

The location estimation function may also return a parameter that indicates the probability $P_{av}$ that the user is available at a particular point in time. The availability parameter captures factors such as availability of location information and availability of radio connection to the user in the network.

The location estimation engine may also provide functions to update the internal measurement database. These functions can, for example, import measurement results from forward lookups (FL) of individual users, import a batch of reverse lookup (RL) data for a larger number of users, or use combinations of these and other techniques. In addition, one or more functions can be invoked to update user behavior-pattern analysis.

The location estimation engine may use one or more of a number of different location estimation methods, including, for example, a trajectory method, an expanding-disk method, and a nucleation-area method, each of which will be described below.

It is possible for the system to use different ones of these methods under different conditions. For example, the trajectory method may be used when recent and reliable velocity measurement data are available, the expanding-disk method may be used when the last location measurement occurred recently but velocity data are not available or are too unreliable, and the nucleation-area method may be used in all other cases. Numerous other types of switching between these and other types of location measurement techniques may be used.

As a more detailed example of switching between the various methods, all three methods may be applied initially in response to a location estimation request. When no explicit velocity data are available, the trajectory method uses the last two location measurements to derive such velocity information. The trajectory method and the expanding-disk method will provide one location area with probability one, $LA_{TR}$ and $LA_{ED}$, respectively. The size of this area captures the uncertainty in all parameters, such as location measurement accuracy, velocity accuracy and probability of user acceleration (including change of direction of motion) over time. The nucleation-area method provides a set of location areas with fractional probabilities $\{LA_{NA}, P_{NA}\}$.

The three initial estimates provided by the respective methods are then compared with respect to their total area size. For the nucleation-area method, the total area size is set to the area covered by location areas with an accumulative probability of at least 50%. This evaluation captures the fact that multiple location areas can overlap with each other. The overlap-area is counted only once and the corresponding probabilities are added up.

Finally, the method that provides the smallest total-area-size is used for the location estimate.

As indicated previously, other types of techniques can be used to determine which of the three exemplary methods, or other methods, should be used under a given set of conditions.

Each of the exemplary methods, that is, the trajectory method, the expanding-disk method and the nucleation-area method, will now be described in greater detail.

Trajectory Method

The trajectory method is based on the availability of velocity information, e.g., speed and direction of motion. Velocity information is obtained from at least two if not more consecutive location measurements. When AGPS is used, for example, the velocity can be directly obtained from one conventional FL. In this case, the FL execution evaluates a sequence of consecutive location measurements and derives a velocity metric from those. This procedure is part of the wireless communication standard known as IS-801.

When such information is not available, velocity can be derived from the measurement results of consecutive lookups. At the typical lookup rates for each user, one can expect that only the last two location measurements be of value.

Which of these two techniques is used for the velocity estimation should be included in the measurement data ("velocity flag").

Let the last two location measurements provide the coordinates $\underline{x}_1$ and $\underline{x}_2$ at times $t_1$ and $t_2$ with radial accuracies of $dx_1$ and $dx_2$, respectively. The average velocity between $t_1$ and $t_2$ can be derived as:

$$\underline{v}_{12} = (\underline{x}_1 - \underline{x}_2)/(t_1 - t_2)$$

The center of the user location area at the present time can be estimated to:

$$\underline{x} = \underline{x}_i + \underline{v}_{12} \cdot (t - t_i),$$

with i=1, 2, i.e., the more recent point of both.

The size of this location area is given by the accuracy of the initial location measurements and the accuracy of the derived velocity.

The accuracy of the velocity has two components; one is due to the accuracy of the location measurement, the other due to the potential change of the actual velocity since the measurements have been performed:

$$d\underline{v} = d\underline{v}_a + d\underline{v}_b$$

For simplicity, we approximate the former contribution of the velocity accuracy by the accuracy in user speed:

$$dv_a = \|d\underline{v}_a\| = \frac{\sqrt{(dx_1^2 + dx_2^2)}}{\|x_1 - x_2\|} \cdot \|\underline{v}\|$$

The later contribution is modeled through an empirical approach:

$$dv_b = \|d\underline{v}_a\| = a \cdot dt = a \cdot (t - 0.5 \cdot (t_2 + t_1)),$$

where a represents an average acceleration term which is estimated or derived from accumulative data.

The resulting speed accuracy is given by:

$$dv = \sqrt{dv_a^2 + dv_b^2}.$$

The radius of the location area becomes:

$$r = \sqrt{dx_1^2 + dx_2^2 + dv^2 \cdot (t - 0.5 \cdot (t_2 + t_1))^2}$$
$$= \sqrt{dx_1^2 + dx_2^2 + (dv_a^2 + dv_b^2) \cdot (t - 0.5 \cdot (t_2 + t_1))^2}$$
$$= \sqrt{dx_1^2 + dx_2^2 + \left(\frac{(dx_1^2 + dx_2^2) \cdot \|\underline{v}\|^2}{\|x_1 - x_2\|^2} + a^2 \cdot (t - 0.5 \cdot (t_2 + t_1))^2\right) \cdot (t - 0.5 \cdot (t_2 + t_1))^2}$$

The accuracy contains constant terms (due to the initial location-measurement accuracy), terms linear in t (due to the speed accuracy associated with the location accuracy) and terms quadratic in t (due to the additional acceleration term). Note that the acceleration term captures both changes in speed and changes in the direction of motion.

When velocity information is provided explicitly from one lookup measurement, the corresponding speed accuracy $dv_a$ should be provided by the network. The second term, $dv_b$, however, is included as shown above. Since the measurement session typically takes a few seconds, which is small compared to typical inter-lookup time frames, $t_2$ and $t_1$ can be set equal to the time stamp of the last measurement.

In the above trajectory estimation, the user's acceleration has been approximated through a scalar parameter. In principle, it is possible to derive the complete acceleration vector from three or more consecutive location measurements. With $\underline{v}_{12}$ and $\underline{v}_{23}$ being the average velocities between times $t_1$, $t_2$ and $t_2$, $t_3$, respectively, the average acceleration vector computes to:

$$\underline{a}_{123} = (\underline{v}_{12} - \underline{v}_{23})/(0.5 \cdot (t_1 + t_2) - 0.5 \cdot (t_2 + t_3)).$$

This estimation suggests an accuracy that may not be justified. Since strong accelerations, such as changing roads, braking to a stop or getting into motion, do usually occur on time scales of a few seconds to one minute, which is far shorter than the typically FL time period, the past measurements can hardly anticipate the present trajectory. It makes sense, however, to derive typical average acceleration distributions from location measurements over time. For that reason, the acceleration has been included into the location-measurement database. It should be sufficient to update the aggregate data once every day, although other update periods may be used.

Expanding-Disk Method

When velocity information is not available, the user's location area can be estimated based on an average- or worst-case speed value. The resulting location area has circular shape and its radius expands with time ("expanding disk").

Let the location measurements provide the coordinate $\underline{x}_1$ at $t_1$ with accuracy $dx_1$ and the speed value be $v_1$ with accuracy $dv_1$. Since no information of the direction of motion is available, the center of the location area does not change:

$$\underline{x} = \underline{x}_1.$$

Instead, the radius of the location area will change with time:

$$r = \sqrt{dx_1^2 + (v_1^2 + dv_1^2) \cdot (t - t_1)^2}$$

In this estimate, the acceleration term has been neglected. The reason for this is that the speed information is very inaccurate and adding additional complexity through empirical acceleration terms seems not justified.

The expanding-disk method can be improved when the average- or worst-case speed value is replaced by aggregate, area-specific speed data obtained from lookups or from external sources. It should be sufficient to update the aggregate speed data once every day although, again, other update periods may be used.

Nucleation-Area Method

Definition of Bin Space

The nucleation area analysis operates on a 3-dimensional (3D) bin space with coordinates longitude, latitude and time. Each 3D bin is referred to as $B_{ijk}$. The lower dimensional subspaces of each 3D bin are referred to as "geographic bin" ($B_{ij}$) or "temporal bin" ($B_k$), respectively. In the geographic plane, the bin space is bound by the bounding rectangle around the network area. In the temporal dimension, it covers the time frame of one day.

For each user, the location measurement data acquired over some extended time frame (e.g., 3 months) are assigned to the bin space. Since in the illustrative embodiment we differentiate between user behavior at workdays and at weekends, we perform the entire process independently for both subsets of measurement data, workdays and weekend days.

The assignment condition for measurement point (x,y,t) to bin $B_{ijk}$ is:

$(x,y,t) \in B_{ijk}$ if $(x_i - dx/2) < x \leq (x_i + dx/2)$ and $(y_j - dy/2) < y \leq (y_j + dy/2)$ and $(t_k - dt/2) < t \leq (t_k + dt/2),$ where (dx, dy, dt) represents the bin size, and $(x_i, y_j, t_k)$ the center of bin $B_{ijk}$. Since the temporal component only captures the time frame of one day, data taken at the same time but at different days are folded into the same temporal bin.

Nucleation Areas Based on Statistical Certainty

The assignment operation leads to a measurement count $c_{ijk}$ for every bin. The total number of measurements for a user during the time frame $(t_k-dt/2)<t\leq(t_k+dt/2)$ is:

$$c_k = \sum_{ij} c_{ijk}.$$

The total measurement count for a user is:

$$c_{tot} = \sum_{ijk} c_{ijk}.$$

When a user exhibits a repetitive behavioral pattern, the location measurement points for that user will nucleate in a small subset of bins, resulting in higher $c_{ijk}$ counts for those bins. The probability $P_{ijk}$ to find a user in $B_{ijk}$ during the $k^{th}$ time interval can be estimated to:

$$P_{ijk} = c_{ijk}/c_k, \text{ with } P_k = \sum_{ij} P_{ijk} = 1.$$

Note that $P_{ijk}$ is normalized with respect to each temporal bin, not the whole day.

In principal, each bin with non-zero $P_{ijk}$ could be defined as one nucleation area $NA_{ijk}$. If all these nucleation areas are kept in memory, they can be used to find the set of location areas, $\{LA\}_k$, where the user can be found at $t \in B_k$ with the associated probability, $P_{ijk}$. This approach, however, leads to reliable results only when the uncertainty $dP_{ijk}$ of $P_{ijk}$ is much smaller than $P_{ijk}$ itself. This means that the set of nucleation areas should be limited to those that meet the condition $\alpha \cdot P_{ijk} > dP_{ijk}$, where $\alpha$ is a design parameter. The probability error $dP_{ijk}$ can be estimated to:

$$dP_{ijk} = dP_k \approx 1/\sqrt{c_k} = 1/\sqrt{\sum_{i'j'} c_{i'j'k}}.$$

It has the same value for all bins with same time index k. The minimum number of counts per nucleation area is:

$$c_k^{min} = \alpha \cdot \sqrt{c_k},$$

which means that only bins with $c_{ijk} > c_k^{min}$ can become nucleation areas.

A reasonable value for $\alpha$ can be found in the following manner. Since the probability error $dP_k$ is independent of $P_{ijk}$ itself, we can divide the probability space into equidistant bins of size $dP_k$ and assign the various $P_{ijk}$ values into this space. The lowest bin has $P_0=0$, the next lowest $P_1=dP_k$, and so forth. Nucleation areas should be created for all $B_{ijk}$ whose $P_{ijk}$ are not in the lowest bin, which sets the condition $P_{ijk} > P_1/2$ or $\alpha=0.5$.

Incremental Bin-Size Expansion

The number of measurement points provided under typical lookup rates (e.g., once per hour) is small, even if an extended time frame is chosen for data acquisition. As a result, the above nucleation-area method may miss user patterns that stretch over several bins due to the lack of counts. The following example illustrates this phenomenon.

Assume that every user is looked up approximately once per hour over 1 month=31 days. This corresponds to approximately 19 working days or an average of $c_k=19$ location measurements per hour. We assume that the temporal bin size is 1 hour. The cutoff count is $c_k^{min} \approx 2.18$ for $\alpha=0.5$; the minimum number of counts per nucleation area is therefore $c_{ijk}=3$. For this cutoff, the maximum number of nucleation areas per temporal bin is 19/3=6. When the 19 measurements points are distributed over 13 bins, with each holding 1 to 2 counts, none of them can be identified as nucleation area since they do not meet condition $c_{ijk} > c_k^{min}$. Some of these bins may be scattered, while others are grouped in close vicinity to each other. The latter ones hold statistically significant information about the presence of the user in the associated area. This information can be extracted if a larger bin size is used. For example, an extension of the geographic bin size by a factor of four may be sufficient to identify multiple nucleation areas with $c_{ijk} > c_k^{min}$. Thus, it may be necessary to repeat the nucleation-area analysis over a large scale of bin sizes to capture nucleation patterns on different length scales.

Geographic Bin-Size Expansion

The nucleation area analysis is repeated multiple times with ascending geographic bin size. In each increment, the geographic bin size can be increased simultaneously in both longitude and latitude. The bin size may be stepped up geometrically, e.g., using a multiplier of two for each geographic component or, equivalently, a factor of four for the geometric bin area.

In every step, all measurement points that have formed nucleation areas have to be taken out of the total set of measurement points used for the subsequent step. This avoids a situation where the same measurement points contribute to multiple nucleation areas.

An algorithm for implementing this aspect of the nucleation-area method is as follows:

1. Select measurement-data set for evaluation (e.g., workdays over 3 months).
2. Set temporal bin size (e.g., 1 hour).
3. Set smallest geographic bin size (e.g., 500 meters).
4. Pre-assign measurement data to temporal bins and compute $c_k$ for each of them.
5. Loop over all temporal bins, k:
   A. Loop over all geographic bin sizes, stepping index s:
      a. Assign measurement data set to geographic bins.
      b. Determine measurement count per bin $c_{ijk}^s$.
      c. Identify new nucleation areas $NA_{ijk}^s$ based on $c_{ijk}^s > c_k$.
      d. Deplete measurement-data set by measurement points assigned to the new nucleation areas $NA_{ijk}^s$ of step s.
      e. Increase geographic bin size by factor 4.
      f. Break: When geographic bin size is larger than network area.
6. End algorithm.

The location areas $\{LA\}_k$, where the user can be found at time t, can be derived from the subset of nucleation areas $NA_{ijk}^s$ with $t \in B_k$. As before, the associated probabilities are: $P_{ijk}^s = c_{ijk}^s/c_k$. Note that location areas of different geographic size can overlap each other.

Simultaneous Expansion of Temporal and Geographic Bin-Size

While the above algorithm can recognize nucleation areas of varying geographic length scales, it may miss patterns that last over longer time frames, i.e., multiple temporal bins, rather than a large number of geographic bins. To capture such patterns, the algorithm may include variations of the temporal bin size as well. This variation should occur independently from the variation of the geographic bin size to recognize nucleation over a small geographic area but long time frames and vice versa.

Since every nucleation analysis reduces the measurement data set by those assigned to the new nucleation areas, each step influences the outcome of the subsequent step. When scanning over a 2-dimensional (2D) parameter space (temporal and geographic bin size), it may not be clear which sequence will lead to the best results. Also, it may not be clear what the appropriate metric should be to rank and compare the outcome of different scanning sequences. The outcome may further depend on the choice of the initial (i.e., smallest) temporal and geographic bin sizes. Reasonable values could be 0.75 hours (=45 minutes) for the temporal bin and 500 m for longitude and latitude. This choice would create 32 temporal bins and around 40,000 geographic bins for a 100 km×100 km market, i.e., 200 in each geographic dimension.

Two potential sequences are shown in TABLE 1 below. Sequence A keeps a monotonic order for the 3D bin-size increments and gives temporal expansion priority over geographic expansion. This sets the focus on patterns, where the user sits at one spot for a long time. Sequence B keeps the product of step increments in the temporal and in one geographic dimension monotonic, and expands first geographic bins, then temporal bins. This emphasizes patterns where the user roams over a larger geographic area for shorter time frames, which may better suit practical applications.

TABLE 1

| Sequence A | | Sequence B | |
|---|---|---|---|
| Bin Size Inc s | Bin component multipliers $(n_x^s, n_y^s, n_t^s)$ | Bin Size Inc s | Bin component multipliers $(n_x^s, n_y^s, n_t^s)$ |
| 1 | (1, 1, 1) | 1 | (1, 1, 1) |
| 2 | (1, 1, 2) | 4 | (2, 2, 1) |
| 4 | (2, 2, 1) | 2 | (1, 1, 2) |
| 4 | (1, 1, 4) | 16 | (4, 4, 1) |
| 8 | (2, 2, 2) | 8 | (2, 2, 2) |
| 8 | (1, 1, 8) | 4 | (1, 1, 4) |
| 16 | (4, 4, 1) | 64 | (8, 8, 1) |
| 16 | (2, 2, 4) | 32 | (4, 4, 2) |
| 16 | (1, 1, 16) | 16 | (2, 2, 4) |
| 32 | (4, 4, 2) | 8 | (1, 1, 8) |
| 32 | (2, 2, 8) | 256 | (16, 16, 1) |
| 32 | (1, 1, 32) | 128 | (8, 8, 2) |
| 64 | (8, 8, 1) | 64 | (4, 4, 4) |
| 64 | (4, 4, 4) | 32 | (2, 2, 8) |
| 64 | (2, 2, 16) | 16 | (1, 1, 16) |
| 128 | (8, 8, 2) | 1024 | (32, 32, 1) |
| 128 | (4, 4, 8) | 512 | (16, 16, 2) |
| 128 | (2, 2, 32) | 256 | (8, 8, 4) |
| 256 | (16, 16, 1) | 128 | (4, 4, 8) |
| 256 | (8, 8, 4) | 64 | (2, 2, 16) |
| 256 | (4, 4, 16) | 32 | (1, 1, 32) |
| 512 | (16, 16, 2) | 4096 | (64, 64, 1) |
| 512 | (8, 8, 8) | 2048 | (32, 32, 2) |
| 512 | (4, 4, 32) | 1024 | (16, 16, 4) |
| 1024 | (32, 32, 1) | 512 | (8, 8, 8) |
| 1024 | (16, 16, 4) | 256 | (4, 4, 16) |
| 1024 | (8, 8, 16) | 128 | (2, 2, 32) |
| … | … | … | … |

Another aspect that should be considered when expanding in the temporal dimension is that various time intervals $B_k$ can have different total counts $c_k$. In the following, index k refers to the smallest temporal bin and index l to any other, eventually expanded, temporal bin. To account for variations of $c_k$ over all k, the count fractions $z_{ijk}^s = c_{ijk}/c_k$ instead of the counts $c_{ijk}$ are used for the analysis. The associated certainty for each count fraction is $dz_{ijk} = \sqrt{c_k}/c_k = 1/\sqrt{c_k}$. For the temporally expanded bin, $B_l$, the total count fraction and its certainty are:

$$z_{ijl} = \sum_{B_k \in B_l} z_{ijk} \text{ and } dz_{ijl} = \sqrt{\sum_{B_k \in B_l} (dz_{ijk})^2},$$

where the sum is taken over all smallest-size bins $B_k$ contained in $B_l$.

The cutoff for nucleation areas can be defined as before:

$$z_l^{min} = \alpha \cdot dz_{ijl}.$$

An algorithm for implementing the above approach is as follows.

1. Select measurement-data set for evaluation (e.g., workdays over 3 months)
2. Set smallest temporal bin size (e.g., 0.75 hours).
3. Set smallest geographic bin size (e.g., 500 m).
4. Loop over temporal and geographic bin sizes, stepping index s:
   A. Assign measurement data to bins
   B. Compute $c_k$ with respect to each temporal bin.
   C. Determine measurement count and count fraction per bin, $c_{ijl}^s$ and $z_{ijl}^s$.
   D. Identify new nucleation areas $NA_{ijl}^s$ based on $z_{ijl}^s > z_l^{min}$.
   E. Deplete measurement-data set by measurement points assigned to the new nucleation areas $NA_{ijl}^s$ of step s.
   F. Increment temporal and geographic bin size according to a sequence (e.g., Sequence A or Sequence B from TABLE 1). The associated bin multipliers are $n_x^s$, $n_y^s$ and $n_t^s$ for the two geographic bins and the temporal bin, respectively.
   G. Break: When geographic bin size is larger than network area.
5. For each $B_k$, identify the total fractional count $z_{ijl}^r$ for the remainder, i.e., the smallest-size geographic bins that are not contained in nucleation areas:

$$z_k^r = \sum_{\substack{ij, \\ B_{ij} \notin NA_{ijl}^s}} z_{ijk} = \sum_{\substack{ij, \\ B_{ij} \notin NA_{ijl}^s}} c_{ijk}/c_k.$$

6. End algorithm.

After all nucleation areas $NA_{ijl}^s$ have been identified, the corresponding location areas and their probabilities are derived for a location request at time t. For that purpose, we decompose the $NA_{ijl}^s$ into nucleation areas of same-size geographic but smallest-size temporal bins:

$$NA_{ijl}^s = \bigcup_{\substack{k, \\ B_k \in B_l}} NA_{ijk}^s.$$

The count fraction of $NA_{ijl}^s$ gets evenly distributed over all decomposed $NA_{ijk}^s$:

$$z_{ijk}^s = z_{ijl}^s / n_l,$$

where $n_l$ is the number of $B_k$ contained in $B_l$.

At time t, the location areas $LA_{ijk}^s$ are equal to the geographic cross sections of all decomposed $NA_{ijk}^s$ with $t \in B_k$.

The derivation of the probability $P_{ijk}^s$ for each $LA_{ijk}^s$ is based on the $z_{ijk}^s$-values for all i,j,s and on $z_k^r$:

$$P_{ijk}^s = \frac{z_{ijk}^s}{z_k^r + \sum_{i'j's} z_{i'j'k}^s}.$$

In this equation, the fractional count of $z_{ijk}^s$ has been normalized to the sum of all fractional counts of decomposed nucleation areas in $B_k$ and remaining areas in $B_k$. Note that as a result of this normalization all location areas derived from one nucleation area $NA_{ijl}^s$ have same geographic size but can have different $P_{ijk}^s$.

Correction to Self-Biasing

The above illustrative approaches work well when the data-acquisition rate is independent of time and the user's location. One or more of the smart lookup approaches described elsewhere herein may violate this condition since such approaches may, for example, schedule location updates more frequently when users have high overlap likelihood with desired ad regions. This biases nucleation areas around ad regions suggesting that the user resides in their vicinity more often than he or she actually does. Although this effect may be self-stabilizing in the steady state, it does create a delayed response when ad regions change.

This self-biasing effect can be mitigated by performing one or both of the following steps.

1. Introducing a guaranteed lowest lookup frequency $f_{low}$ into the SFL (say once per 2 hour period).

2. Normalizing count numbers over time windows of $T_{low} = 1/f_{low}$ before entering them into the bin space.

The second step above represents a pre-binning of all measurement data with respect to the temporal dimension. The pre-binning space $\Omega_{96}$ extends the entire time axis $\tau$ of all measurement data and has bin size $T_{low}$. The measurement data are entered into this pre-bin space for each user. Then the number of counts $\gamma_\tau$ per time bin $\Omega_\tau$ is determined. When the measurement data are entered into the bin space $B_{ijk}$, each count's contribution to $c_{ijk}$ is weighted by $1/\gamma_\tau$ of its pre-bin. This leads to a fractional value for $c_{ijk}$. This fraction count will then be normalized by Ck to create $z_{ijk}$, etc.

An algorithm for implementing the above approach is as follows.

1. Select measurement-data set for evaluation (e.g., workdays over 3 months)
2. Set time frame $T_{low}$ for pre-binning.
3. Pre-bin data into $\Omega_\tau$.
4. Determine counts $\gamma_\tau$ per $\Omega_\tau$.
5. Set smallest temporal bin size for bin space (e.g., 0.75 hour).
6. Set smallest geographic bin size for bin space (e.g., 500 m).
7. Loop over temporal and geographic bin sizes, stepping index s:
   A. Assign measurement data to bins with pre-bin weight factor $1/\gamma_\tau$.
   B. Compute $c_k$ with respect to each temporal bin.
   C. Determine measurement count and count fraction per bin, $c_{ijl}^s$ and $z_{ijl}^s$.
   D. Identify new nucleation areas $NA_{ijl}^s$ based on $z_{ijl}^s > z_1^{min}$.
   E. Deplete measurement-data set by measurement points assigned to the new nucleation areas $NA_{ijl}^s$ of step s.
   F. Increment temporal and geographic bin size according to a sequence (e.g., Sequence A or Sequence B in TABLE 1). The associated bin multipliers are $n_x^s$, $n_y^s$ and $n_t^s$ for the two geographic bins and the temporal bin, respectively.
   G. Break: When geographic bin size is larger than network area.
8. For each $B_k$, identify the total fractional count $z_{ijl}^r$ for the remainder, i.e., the smallest-size geographic bins that are not contained in nucleation areas:

$$z_k^r = \sum_{\substack{ij, \\ B_{ij} \notin NA_{ijl}^s}} z_{ijk} = \sum_{\substack{ij, \\ B_{ij} \notin NA_{ijl}^s}} c_{ijk}/c_k.$$

9. End algorithm.

Non-Availability of Users

The illustrative algorithms given above do not specify how measurement data have to be processed that do not yield any location information. This is the case, for instance, when the user does not have coverage, has powered down his/her mobile device, has roamed to a different network, or has set a location information restriction (LIR) flag.

It is assumed for purposes of illustration that these conditions may be held by the location database as "not available" with an associated time stamp. When a user was looked up 100 times during temporal bin $B_k$, but was available only twice with geographic bin locations $B_{ij}$ and $B_{i'j'}$, the probability to find the user in either of these two bins should be set to 0.01 rather then 0.5. This example indicates that the non-availability should be taken into account in the normalization.

For this purpose an additional geographic bin $B_{ij} = B_{off}$ may be introduced, which has no neighbor relation with any other bin, but whose entries are considered in the total count $c_k$. This automatically includes non-availability into the location area probabilities.

It further makes sense to provide availability information as an additional property to a smart lookup process. This allows a reduction in the number of lookups to levels significantly below $f_{low}$ for users that are never (or hardly ever) available. The corresponding lookup rate is $f_{off}$. To avoid an additional pre-binning operation on time scale $T_{off} = 1/f_{off}$, measurement data with consecutive "non-availability" results that are more than one $T_{flow}$ apart are filled in with artificial non-availability data at the center of all $\Omega_\tau$ pre-bins in-between. These additional data are also entered into the bin space $B_{ijk}$.

An additional availability-area ($AA_k$) analysis can be performed in temporal dimension with respect to availability alone. This analysis follows the same concept as the nucleation area analysis, but only in one dimension, that is, the temporal dimension. It allows identifying the typical time frames for each user where the user is not available, e.g., during nights or during weekends. As a result, a smart lookup process could save throughput resources by looking up these users at a very low rate.

Nucleation-Area Update Frequency

Since nucleation areas capture the integral user behavior over a longer time frame, they are relatively insensitive to the most recent location updates. Thus, such areas need not be updated very frequently. For example, it may be sufficient in a given application to update all nucleation areas at the end of each day (e.g., at midnight). Of course, other update frequencies may be used in other embodiments.

Again, it is to be appreciated that the particular system elements, process operations and other features of the illustrative embodiments described above are presented by way of example only. As indicated previously, the above-described techniques can be adapted in a straightforward manner for use in other types of wireless communication systems and with other types of location-based services. In addition, the invention can be applied to sub-networks or other designated portions of a given wireless network, or to combinations of multiple wireless networks or other networks of potentially differing types. These and numerous other alternative embodiments within the scope of the appended claims will be readily apparent to those skilled in the art.

What is claimed is:

1. A method of providing location-based services, the method comprising the steps of:
    obtaining profile information for users associated with respective mobile user devices associated with a wireless network;
    obtaining location information for said mobile user devices;
    generating user movement statistics based on the location and profile information; and
    controlling delivery of at least one message to a given one of the mobile user devices based on the user movement statistics;
    wherein the user movement statistics characterize movement of multiple users over a designated geographic region for a particular period of time; and
    wherein the user movement statistics comprise information sufficient to determine approximately how many users having particular designated characteristics are likely to be in a given location within the designated geographic region at a given time subsequent to the particular period of time.

2. The method of claim 1 wherein the obtaining, generating and controlling steps are implemented in a location-based services system that is external to the wireless network.

3. The method of claim 2 wherein the location-based services system is coupled to a processing device of the wireless network via a gateway.

4. The method of claim 1 wherein the profile information comprises user preferences.

5. The method of claim 1 wherein the profile information comprises demographic information.

6. The method of claim 1 wherein the user movement statistics are utilized to determine prices charged for delivery of messages to the mobile user devices.

7. The method of claim 1 wherein the user movement statistics are utilized to determine appropriate bidding levels for auction of one or more message delivery opportunities to interested parties.

8. The method of claim 1 wherein the user movement statistics are utilized to estimate impact of a marketing campaign comprising messages delivered to the mobile user devices.

9. The method of claim 8 further including the step of adjusting the marketing campaign as a function of the estimated impact.

10. The method of claim 1 wherein the user movement statistics are determined at least in part using information stored in a subscriber database of the system.

11. A computer-readable medium having embodied therein executable program code which when executed by at least one processing device implements the method of claim 1.

12. An apparatus for use in providing location-based services, the apparatus comprising:
    a location-based services system comprising at least one processing device having a processor coupled to a memory;
    wherein the location-based services system is adapted to obtain profile information for users associated with respective mobile user devices associated with a wireless network, to obtain location information for said mobile user devices, and to generate user movement statistics based on the location and profile information;
    wherein the location-based services system is further adapted to control delivery of at least one message to a given one of the mobile user devices based on the user movement statistics;
    wherein the user movement statistics characterize movement of multiple users over a designated geographic region for a particular period of time; and
    wherein the user movement statistics comprise information sufficient to determine approximately how many users having particular designated characteristics are likely to be in a given location within the designated geographic region at a given time subsequent to the particular period of time.

13. The apparatus of claim 12 wherein the location-based services system is external to the wireless network.

14. The apparatus of claim 12 wherein the location-based services system is implemented using a layered architecture comprising at least an application support layer, an application enabling layer, a location-based service enabling layer and a network connectivity layer.

15. The apparatus of claim 14 wherein the location-based service enabling layer comprises a location server adapted to limit location-related communications between the mobile user devices and base stations of the wireless network by at least one of eliminating duplicate location queries and prioritizing location queries.

16. The apparatus of claim 14 wherein the network connectivity layer comprises a location and presence query module adapted to obtain mobile user device location and presence information.

17. A mobile user device associated with a wireless network, the mobile user device being configured to receive at least one message that is controllably delivered to the mobile user device based on user movement statistics that are determined from (i) location information obtained for the mobile user device and other mobile user devices associated with the wireless network and (ii) profile information of users associated with respective ones of the mobile user devices, wherein the user movement statistics characterize movement of multiple users over a designated geographic region for a particular period of time, and wherein the user movement statistics comprise information sufficient to determine approximately how many users having particular designated characteristics are likely to be in a given location within the designated geographic region at a given time subsequent to the particular period of time.

18. The mobile user device of claim 17 wherein the user movement statistics are generated in a location-based services system that controls the delivery of the message to said mobile user device.

* * * * *